Patented Feb. 25, 1936

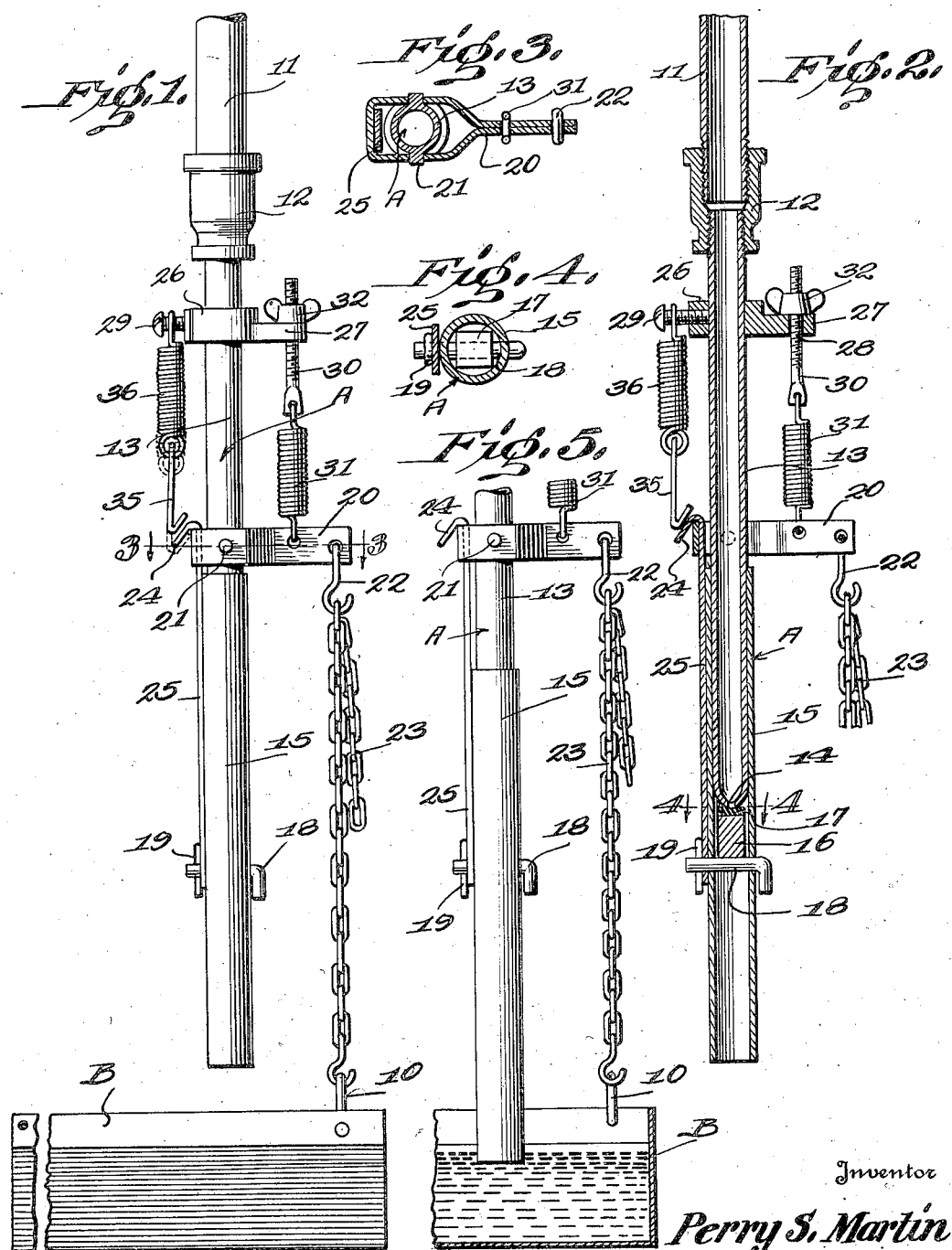

2,031,723

UNITED STATES PATENT OFFICE 2,031,723

DRINKING FOUNTAIN

Perry S. Martin, Harrisonburg, Va.

Application August 9, 1930, Serial No. 474,199

16 Claims. (Cl. 251—134)

This invention appertains to watering devices for chickens and the like, and more particularly to watering devices in which the flow of water to the drinking pan is controlled by the quantity of water in the pan.

One of the primary objects of my present invention is the provision of novel means for delivering the water to the drinking pan by the use of a depending vertical pipe without the employing of elbows or the like, whereby a number of the depending pipes for individual drinking pans can be supplied from a single horizontal supply pipe.

Another important object of my invention is the provision of novel means for arranging the control valve above the outlet end pipe of the dispensing pipe, so as to eliminate the splashing of the water over the valve and into the pan as now experienced with certain types of valves now on the market and whereby the dispensing pipe can be disposed with its outlet end in the water of the pan so as to further eliminate the splashing of the water.

It is also an object of my invention to provide a valve having a relatively long downwardly extending discharge pipe for dispensing water into a pan or trough which is adjustable to various heights, said discharge pipe extending into the pan or trough or into an extension on the pan or trough.

A further salient object of my invention is the provision of a sleeve slidably mounted on an outlet pipe having a restricted water exit with a valve carried by said sleeve for said exit, spring means being provided for acting on the sleeve to hold the valve off of the exit, the weight of the water in the pan acting against said spring to seat the valve, whereby when the tension of the spring overcomes the weight of the water in the pan, the desired quantity of water will be automatically delivered to the pan, after which the weight of the water will again seat the valve.

A further object of my invention is the provision of novel means for constructing the valve and novel means for removably mounting the valve in the sleeve, the valve being adapted to be arranged at either side of a holding pin carried by the sleeve, the pin being arranged nearer one end of the sleeve than the other whereby the sleeve can be inserted on the outlet pipe from either end thereof and not prevent the adjustment of the sleeve relative to the water pan.

A further object of my invention is the provision of means for holding the valve on its seat independent of the water pan, whereby the water pan can be removed for cleaning purposes without the wasting of water.

A further object of my invention is the provision of novel means for adjusting the tension of the spring employed for acting on the sleeve, so that the time of seating or unseating of the valve according to the amount of water in the pan can be regulated.

A still further object of my invention is to provide a water valve automatically controlled by the amount of water in the water pan of the above character, which will be durable and efficient in use, one that will be simple and easy to manufacture, and one which can be placed on the market at a reasonable cost.

With these and other objects in view my invention consists in the novel construction, arrangement, and formation of parts, as will be hereinafter more specifically described, claimed, and illustrated in the accompanying drawing, in which drawing:—

Figure 1 is a side elevation of my improved automatic water valve.

Figure 2 is a longitudinal section through the same.

Figure 3 is a horizontal section taken on the line 3—3 of Figure 1, looking in the direction of the arrows, illustrating the arrangement of the yoke lever to which the tension spring and water pan are attached.

Figure 4 is a detail horizontal section taken on the line 4—4 of Figure 2, looking in the direction of the arrows, illustrating the formation of the valve, and Figure 5 is a fragmentary side elevation of my improved automatic valve showing the sleeve in its reverse position and when its outlet end is disposed in the water in the water pan for preventing the splashing of the water, the water pan being shown in section.

Referring to the drawing in detail, wherein similar reference characters designate corresponding parts throughout the several views, the letter A generally indicates my improved automatic valve for a water pan or trough B. The trough or pan B is of the usual or conventional construction and is supported at one end and its opposite end is left free and provided with a pivoted bail or loop 10, for a purpose which will be later described.

My improved water valve A includes a depending supply pipe 11 which can be connected in any desired way with a horizontally disposed feeder pipe and the supply pipe is connected by means of a reducing coupling 12 with an outlet pipe 13, the lower end of which is provided with a restricted water exit 14. The lower end of the outlet pipe 13 receives a sleeve 15 which has removably mounted therein a valve plug 16. This valve plug 16 is of a polygonal shape in cross section, so as to allow the free flow of water around the same and the upper end of the valve plug is provided with a disk 17 of the same shape as the plug for seating against the exit 14 for preventing the flow of water therethrough. This sleeve has diametrically extending through the same a removable holding pin 18 on which the valve plug rests and the pin is normally held against withdrawal by suitable removable means 19. It is to be noted that the pin 18 is arranged closer to one end of the sleeve than the other and that the valve can be positioned on one side of the pin or the other. By this arrangement either end of the sleeve can be placed on the outlet pipe 13, whereby the actual length of the sleeve projecting below the lower end of the outlet pipe can be governed. Thus when it is desired to have the sleeve terminate above the water pan, the long end of the sleeve can be placed upon the outlet pipe, but when it is desired to have the sleeve terminate in the water pan the short end of the sleeve can be placed on the outlet pipe. This is clearly shown in Figure 5 of the drawing. The sleeve is freely slidable on the outlet pipe and is normally held in a raised position with the valve seated against the exit, by the water pan and to bring about this result I provide a yoke lever 20 which straddles the outlet pipe 13 above the sleeve. The pipe 13 can be provided with radially extending diametrically opposed pivot lugs 21 on which the yoke is mounted, and the long arm of the yoke has pivotally connected thereto a depending hook 22 to which is attached a chain 23, the lower end of which is hooked over the pivoted bail or loop 10 carried by the water pan B. The short arm of the yoke lever 20 has the hooked end 24 of a strap 25 placed thereover and the lower end of the strap is connected to the sleeve 15 by means of the pin 18. Thus it can be seen that the weight of the water in the pan will pull down on the long arm of the yoke lever and pull up on the short arm of the lever, consequently raising the sleeve 15 and the valve against the exit 14.

Above the pivoted yoke lever 20, the outlet pipe 13 receives a collar 26 and this collar is provided with a radially extending arm 27 having a vertical opening 28 therethrough. The collar 26 is held in an adjusted position on the outlet pipe 13 by a screw 29 carried by the collar, and this screw is adapted to impinge against said pipe. The vertical opening 28 receives a threaded bolt or shank 30 to the lower end of which is secured a relatively heavy contractile coil spring 31. The lower end of the spring is in turn hooked to the long arm of the lever 20 intermediate the hook 22 and the pivot point of said lever. A winged nut 32 is threaded on the bolt or shank 30 and rests against the arm 27 and by adjusting the bolt or shank, the tension of the spring 31 can be regulated. It is to be noted at this point that the tension of the spring 31 acts against the weight of the water in the water pan or trough B.

In operation of the improved device, the weight of the water in the trough or pan B normally holds the valve on the exit and consequently prevents the flow of water through the pipe 13 into the pan or trough. When the weight of the water in the pan is overcome by the tension of the spring 31, the long arm of the lever is raised and the short arm of the lever is lowered allowing the sleeve 15 to slide down on the outlet pipe and the valve plug 16 away from the exit 14. This will allow the water to flow through the pipe 13 around the valve into the sleeve and then into the pan or trough B. As soon the weight of the water again overcomes the tension of the spring 31, the long arm of the lever will be pulled down and the valve will again be seated.

In order to permit the removal of the trough or water pan B for cleaning purposes without allowing the escape of water, I provide a hook 35 for engaging the hooked end 24 of the strap 25 and it is to be noted that this hook 35 is carried by a contractile coil spring 36 which can be carried by the screw 29. When the hook 35 is placed over the hook 24 the spring 36 is tensioned so that the same acts to raise the sleeve and hold the valve against the exit 14.

From the foregoing description, it can be seen that I have provided an exceptionally simple type of automatic water valve for feed troughs which includes a minimum number of operating parts and which parts can be readily renewed when necessary or desirable.

Changes in detail may be made without departing from the spirit of my invention, but what I claim as new, is:—

1. In an automatic water valve for water troughs, a depending outlet pipe having a restricted exit forming a valve seat, a sleeve extending below and slidable on said pipe, a pin extending transversely into said sleeve, a valve for the exit carried in the sleeve and resting freely on said pin whereby removal of the pin allows the valve to drop out of the sleeve, and spring means normally urging the sleeve in one direction, said sleeve acting as a discharge pipe for guiding the water from the valve.

2. In an automatic water valve, a depending outlet pipe having a reduced end exit forming a valve seat, a guide sleeve slidable on said pipe and extending below said end for guiding the water beyond said valve seat, a pin extending transversely thru said sleeve below said exit, a valve for the exit carried by the sleeve, a lever pivoted on said pipe, said lever including a short arm and a long arm, means connecting one arm to the pin, and spring means connected with one of said arms normally acting to hold the valve open, as and for the purpose specified.

3. In an automatic water valve, a depending outlet pipe having a restricted exit at one end defining a valve seat, a sleeve slidable on said pipe, a valve for the exit carried in the sleeve, a pin extending diametrically through the sleeve, a valve carrier disposed in the sleeve and resting on said pin, a lever pivotally carried by the pipe above said sleeve including a long arm and a short arm, a means connecting said pin to the short arm to support the sleeve whereby raising and lowering of the short arm raises and lowers the sleeve, a bracket adjustably mounted on the pipe above the lever, spring means connecting the bracket to the long arm of the lever normally acting to open the valve, and means for adjusting the tension of said spring.

4. In an automatic water valve, a depending outlet pipe having a restricted exit defining a valve seat, a sleeve slidably mounted on said pipe and extending beyond said seat for guiding water away from said exit, a valve for the exit carried loosely in the sleeve, a valve closing means, means connecting the valve closing means with the sleeve for moving the valve against its seat, spring means normally opposing said movement and for causing the valve to move away from its seat, and spring means connectible for holding the valve on its seat.

5. In an automatic water valve for water troughs, a depending outlet pipe having a restricted exit defining a valve seat, a sleeve slidable on said pipe, and a valve for the exit carried loosely in the sleeve, a pivoted yoke straddling said pipe above the sleeve and including a short arm and a long arm, spring means engaging the long arm normally acting to move the valve away from the exit, a pin extending transversely through the sleeve for supporting the valve in said sleeve, means connected with said pin having a hooked end engaging the short arm of the lever, and spring means for releasably engaging said hooked arm for holding the valve on its seat.

6. An automatic water valve comprising a straight length of pipe threaded at one end for connection to a water main and reduced at the other end to form a valve seat, pivoting means intermediate the ends of said pipe, a lever pivotally supported on said means, a sleeve reciprocably telescoping the reduced end of said pipe, an elongated member connected to one end of the lever, a pin extending transversely thru said sleeve for connecting said member to the sleeve, a valve resting on said pin whereby upon movement of the lever the valve is moved toward and away from the reduced end of the pipe to close and open the same.

7. The device of claim 6 plus a bracket removably secured to said pipe above said pivoting means, means carried by said bracket for forcing and holding said sleeve to valve closing position and spring means on said bracket tending to move said sleeve to valve opening position, both of said means being adjustable and said valve closing means being normally inoperative.

8. In an automatic water valve, a depending outlet pipe having an open lower end exit forming a valve seat, a sleeve for guiding water beyond said exit, a removable pin extending transversely thru said sleeve arranged in closer proximity to one end of the sleeve than the other, and a valve being removably mounted in the sleeve and insertable therein from either end thereof and adapted to engage either side of said pin, the sleeve being slidable on the pipe from either end of the sleeve, as and for the purpose specified.

9. The device of claim 6 in which the cross section of the sleeve is circular and the vertical edges of the valve loosely engage the inner walls of the sleeve whereby said valve is always centered and also is easily removable for repairs upon inverting said sleeve.

10. The device of claim 6 in which the cross section of the sleeve is circular, the cross section of the valve is rectangular and the vertical edges of the valve lightly engage the inside of the pipe whereby water may pass by the valve.

11. In a water valve, a depending outlet pipe, a sleeve slidable on the pipe, a pin extending transversely thru said sleeve below the end of said pipe, a valve support in said sleeve resting on said pin, a valve carried by said support and means for moving said sleeve to thereby force the valve against the end of said pipe to close the same, said pin being readily removable and said means being attached to said pin and thereby forming the sole support of the sleeve and valve whereby removal of the pin permits the removal of the sleeve for inspection and repair of the valve.

12. In an automatic water valve, a depending outlet pipe, a tubular sleeve slidable on the pipe, a pin extending transversely thru said sleeve and limiting the amount of telescoping of the sleeve on the pipe, a valve support between the pin and the end of the pipe and resting on said pin, a valve carried by the support, a lever pivoted on the pipe above the sleeve, a strap connecting one arm of said lever to said pin, a spring connecting the other arm of the lever to said pipe, whereby as the lever is turned about its pivot against the action of said spring the sleeve is moved upward forcing said valve against the end of the pipe to close the same.

13. In a water valve for a poultry drinking trough, an elongated water pipe having an exit end, an elongated pipe forming a sleeve and having an inside bore of such size as to fit the outside of the water pipe so that the sleeve may slide upon and be guided by the water pipe, valve means within the sleeve and movable therewith, said valve means being of such size as to close the exit end of the water pipe but not to close the bore of the sleeve, means to move the sleeve so as to open the valve means, and additional means yieldingly resisting the valve opening movement of the sleeve so as to hold the valve closed.

14. In a water valve, an outlet pipe having a restricted exit forming a valve seat, a sleeve slidable on said pipe and extending beyond said exit, to guide water therefrom, means for supporting said sleeve on said pipe including a pin extending transversely thru said sleeve and a valve resting on said pin, said pin being removable whereby the sleeve and valve may be separated from said pipe and from each other merely by removal of the pin.

15. In an automatic water valve comprising a short length of pipe having means on one end for connection to a water main and having a reduced end forming a valve seat, a sleeve loosely telescoping over said end and extending beyond said seat to guide water therefrom, linkage for supporting said sleeve on said pipe, said linkage including a pin extending transversely thru said sleeve, a valve loosely engaging the inside of said sleeve and resting on said pin to be moved thereby against said seat, said pin being removable to permit sliding of the sleeve from the pipe and to permit dropping the valve from the sleeve, said linkage being spring actuated to move the sleeve to valve opening position and means for connecting a weight on said linkage to move said sleeve to valve closing position.

16. In a weight operated water valve, an outlet pipe having a reduced end exit forming a valve seat, a guide sleeve telescoping said pipe and extending beyond said exit for guiding water beyond said valve seat, a pin extending transversely into said sleeve, a valve resting on said pin and carried by said sleeve, a lever pivoted on said pipe, means connecting one arm of the lever to the pin whereby movement of the lever operates the valve, spring means for moving the lever to operate the valve, and means for connecting the lever to a weight whereby to utilize gravity when it is desired to operate the valve oppositely to said spring means.

PERRY S. MARTIN.